United States Patent [19]
Wallace

[11] 3,850,553

[45] Nov. 26, 1974

[54] STALL TORQUE AIR SHUT-OFF CONTROL FOR PNEUMATIC NUT RUNNERS

[75] Inventor: William K. Wallace, Barneveld, N.Y.

[73] Assignee: Chicago Pneumatic Tool Company, New York, N.Y.

[22] Filed: Oct. 15, 1973

[21] Appl. No.: 406,143

[52] U.S. Cl. .................. 418/43, 137/56, 137/58
[51] Int. Cl. ........................................... G05d 13/34
[58] Field of Search .............. 137/56, 58; 415/36; 418/42, 43, 44

[56] References Cited
UNITED STATES PATENTS

| | | | |
|---|---|---|---|
| 2,646,813 | 7/1953 | Mueller | 137/58 |
| 2,938,502 | 5/1960 | Neal | 137/56 X |
| R25,210 | 7/1962 | Jackson | 137/56 |

*Primary Examiner*—Robert G. Nilson
*Attorney, Agent, or Firm*—Stephen J. Rudy

[57] ABSTRACT

A centrifugally operable pressure air relief valve unit comprising a body having an axially extending hub adapted for connection with a rotor shaft of a motor for rotation with the motor, a chamber within the body having a ball valve seat connecting with a vent port through the body, an air inlet port to the chamber adapted for connection with a source of pressure air, a ball valve axially movable in the chamber relative to the seat in response to centrifugal forces created by rotation of the unit, and a spring normally biasing the ball valve closed upon its seat.

7 Claims, 4 Drawing Figures

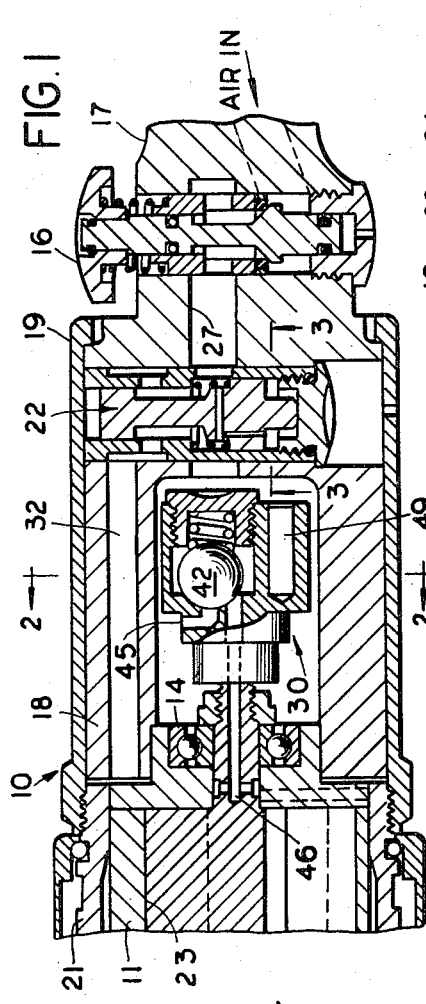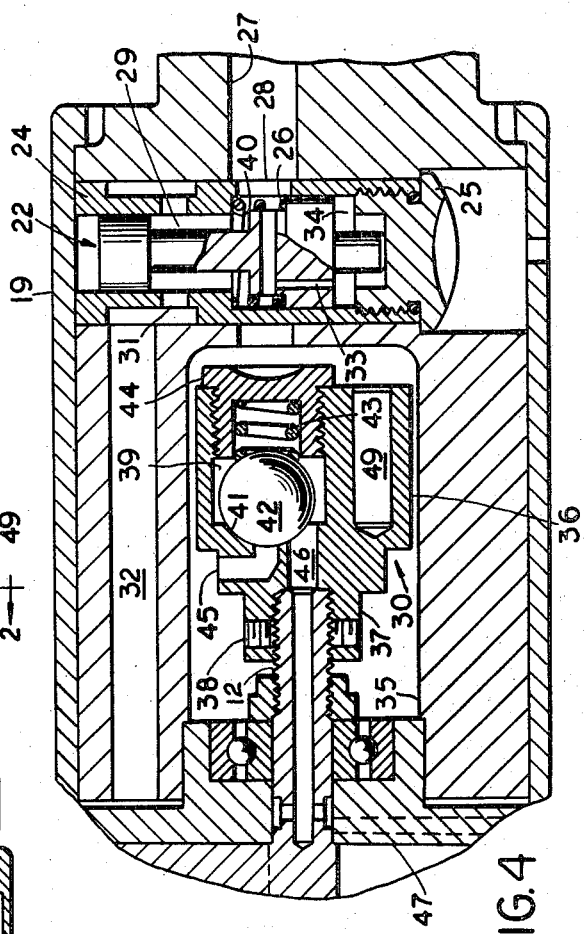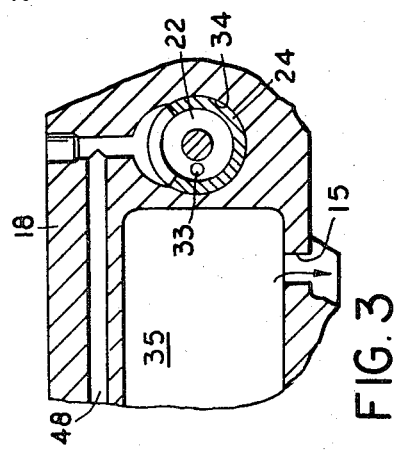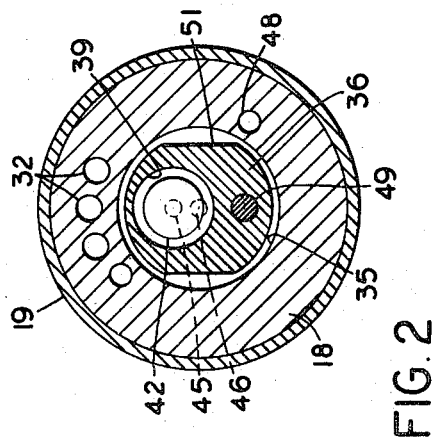

3,850,553

STALL TORQUE AIR SHUT-OFF CONTROL FOR PNEUMATIC NUT RUNNERS

BACKGROUND OF THE INVENTION

This application is a division of application Ser. No. 301,942, filed Oct. 30, 1972, now U.S. Pat. No. 3,791,458.

This invention relates to air shut-off control devices for pneumatically powered tools such as nut runners and the like used in driving threaded fasteners. The general purpose of the device is to cause operating air feed to the motor to be automatically shut off when the motor has obtained a stalled condition.

While the control device of the present invention may be subject to various applications, it is especially suited for incorporation in pneumatically powered nut running tools.

It is not a purpose of the device of the present invention to control the torque being delivered by the tool to the work, but rather it is a purpose of the device to shut off the operating air to the motor when the motor has stalled, that is, reached its torquing capacity.

In accordance with the invention, a device which is centrifugally operated by an air vane motor is employed in a pneumatic tool in association with an air shut-off valve. The device functions to sense a stalled condition of the motor and then causes actuation of the valve to shut off the flow of operating air to the motor.

A pneumatically powered nut runner utilizing this device has a number of advantages. The natural ability of an air motor to control torque delivery is not interfered with. The flow of air to the tool is terminated upon the air motor reaching its torque capacity and stalling. When the tool obtains this condition, the operator will known that the work has been properly torqued and it will not be necessary for him to further torque the work by using the tool as a hand wrench. In this latter respect, the automatic termination of the air to the motor upon stall reduces the work effort of the operator.

A feature of the invention is a ball valve control unit, the body of which rotates with the shaft of the motor and has an internal chamber in which a heavy ball valve normally seated under the bias of a spring over an exhaust air port is responsive to centrifugal forces created by the motor to move against the bias of the spring to open condition so as to communicate an inlet port with the exhaust port, and is subject to the bias of the spring to return to seated condition when the motor has stalled.

A desirable advantage of the ball valve unit is its compact size whereby it is enabled to occupy a relatively small area in the tool and thus aids in obtaining a tool of compact size and light weight.

Another advantage of the unit is the instantaneous unseating action of the ball valve against the bias of its spring in response to rotary start-up movement of the motor to which the unit is attached.

Another advantage of the unit is the force factor which the ball valve develops in response to the centrifugal action of the motor whereby the ball remains unseated until the motor has stalled and then returns to its seat under the bias of its spring.

A still further advantage of the unit which makes its use desirable in pneumatic tools is the limited number of its component parts and the simplicity of their cooperative association and organized arrangement.

The foregoing objectives, features and advantages of the invention, as well as others, will become apparent as this specification proceeds in further detail and as it is read in conjunction with the accompanying drawing wherein an embodiment of the invention is illustrated. It is to be expressly understood, however, that the drawing is for purposes of illustration and is not to be construed as limiting the scope of the invention.

BRIEF DESCRIPTION OF THE DRAWING

In the accompanying drawing:

FIG. 1 is a longitudinal section of a portable pneumatic nut runner in which the invention is embodied, only so much of the nut runner as is needed to understand the invention being shown;

FIG. 2 is a section on line 2—2 of FIG. 1;

FIG. 3 is a fragmentary section on line 3—3 of FIG. 1; and

FIG. 4 is an enlarged view of the central portion of FIG. 1 to further clarify the arrangement of the components thereof.

DESCRIPTION OF PREFERRED EMBODIMENT

Reference is now directed to the illustrated embodiment of the invention in the accompanying drawing wherein there is shown a portable pneumatically powered rotary nut running tool having a general housing 10. Within the housing is a conventional air driven rotary stall torque motor 11 of the air vane type. The shaft ends of the rotor (only the rear shaft end 12 being shown) are supported in conventional manner in bearings 14.

Rotation of the motor is transmitted through conventional reduction gearing (not shown) and a driving spindle to a nut running socket at the front end of the tool to torque the work, such as a nut or bolt head.

A manipulative throttle valve 16 in a handle section 17 of the housing controls flow of live supply air through the handle to the motor. Air spent in driving the motor exhausts in conventional manner from the housing of the tool. An air shut-off control section 18 of the housing is connected by means of a clamp nut 19 between a motor section 21 and the handle section 17 of the housing.

Housed in section 18 is an air shut-off valve 22 controlling flow of live supply air from the throttle valve to the motor chamber 23. Valve 22 is a spool type that is slidable or shiftable between open and closed positions in a valve bushing 24 fitted in the housing. One end of the bushing is closed by a screw cap 25; and the other end is closed over by the wall of the clamp nut 19. A spring 26 biases the valve to a normally open condition, as in FIGS. 1 and 4. In this condition, supply air flowing from the throttle valve into a passage 27 enters through a side port 28 of the valve bushing 24 to a chamber 29 about the neck of the shut-off valve and passes out through a side port 31. From the latter port, the air flows through connecting passages 32 to the motor chamber 23 to drive the motor. Inlet air entering the side port 28 also flows through a restricted passage or bleed port 33 in the body of the shut-off valve to a control chamber 34 below the valve.

The effective pressure area of the underside of the shut-off valve is relatively greater than that of the opposite area about the neck of the valve so that if the pressure of air entering the control chamber 34 were allowed to develop, it would pneumatically unbalance the valve sufficiently to cause it to move against the bias of its spring to close and shut off flow of supply air from port 28 to the motor.

Because of the greater diameter of the passage means 32 connecting the throttle outlet passage 27 with the motor relative to the restricted passage 33 leading to the control chamber 34 below the shut-off valve, the volume of air fed to the motor will have started the motor rotating before the pressure of air in chamber 34 can build up sufficiently to close the valve. However, a centifugally operable control relief valve unit 30, operatively connected to the motor, is designed to prevent building up of closing air pressure in chamber 34 beneath the shut-off valve until the motor has been stalled by a torqued condition of the work.

The control valve unit 30 is arranged in an exhaust chamber 35 of the housing for relative rotation. The exhaust chamber is vented at all times to atmosphere through a port 15 (FIG. 3). The control valve unit includes a housing or body 36 having an axially extending hub 37 which is threadedly mounted upon the rear shaft end 12 of the rotor. A pair of set screws 38, arranged in balanced relation to each other, lock the hub to the rotor shaft. A valve chamber 39 located eccentrically in the body of the valve unit has a valve seat 41 upon which a heavy ball valve 42 is normally seated under the bias of a spring 43. The spring is seated in a retaining screw cap 44 which is threaded into a rearwardly open end of the valve chamber. The cap is removable (when needed) for cleaning of the valve chamber or for replacement of the ball or spring. When the ball is seated, it closes over one end of a relief passage 45, the other end of which passage exits through the body of the valve unit into the exhaust chamber 35. The valve chamber 39 is at all times in communication with the control chamber 34 below the shut-off valve by means of a passage, generally indicated at 46. Passage 46 leads from the valve chamber 39 through the body of the control valve unit into the rotor shaft 12 from where it connects through a motor bearing plate 47 with a passage 48 (FIG. 3) extending through the wall of the housing to the control chamber 34 below the shut-off valve. The passages leading from chamber 34 to the relief valve chamber 39 and the relief passage 45 are of greater diameter than that of the restricted bleed port 33. This allows swift relief or dumping of pressurized air from air chamber 34 when the ball is unseated.

Here, the ball is formed of a heavy material, such as steel. Because of the location of the ball eccentrically of the body of the control valve unit 30, the body portion of the control valve unit opposed to the ball is solid and is weighted by a pin 49 as a counterbalancing measure whereby the weight of the valve unit is evenly balanced upon the rotor shaft. This arrangement is desired so as to prevent undesirable vibration of the control valve unit, as might otherwise occur. Side flats 51 (FIG. 2) are provided for application of a wrench to the body 36 in assembling the control valve unit to the rotor shaft. The external contour of the body of the valve unit is of symmetrical contour to further promote its balanced condition upon the rotor shaft.

In summary of the operation of the nut runner, the operator depresses the throttle valve 16 causing supply live air flowing into the handle 17 to enter passage 27 from where it flows to the side port 28 of the shut-off valve bushing 24. From port 28, the supply air bleeds in restricted volume through port 33 to the control chamber 34 below the shut-off valve 22; and it simultaneously flows in relatively greater volume around the neck of the shut-off valve and through the passages 32 to rotate the motor.

As the motor suddenly rotates from a rest condition, the inertia of the ball 42 causes the latter to unseat against the bias of the spring 43; and it remains unseated as the speed of the motor rapidly accelerates above 10 percent of its free speed value. Ten percent of the motor's free speed creates enough centrifugal force to hold the ball off its seat. The unseated ball causes the restricted supply air flowing to the control chamber 34 to be relieved through port 45 of the control valve unit 30 to the exhaust chamber 35 before the air can build up sufficient pressure in chamber 34 at the underside of the shut-off valve to shift the latter to its closed condition relative to the side port 28.

Rotation of the motor is transmitted through the connecting gearing and spindle (not shown) to run down and torque the work. The torque being transmitted to the work causes the motor to de-accelerate. The de-acceleration of the motor creates a force on the ball 42 so that the ball remains off its seat until the motor has slowed far below the 10 percent of its free speed value. Once the motor has torqued the work to the limit of its capacity and stalled, the ball re-seats under the force of its spring 43 to close the relief port 45. Then the air feeding through the small bleed port 33 pressurizes the control chamber 34 under the shut-off valve to shift the latter to its closed condition upon an overhead shoulder or seat 40. This terminates further air feed to the motor. In this shifted action, the shut-off valve blocks the side port 28 off from the passages 32 leading to the motor. But the bleed port 33 remains open to port 28 and continues to feed pressurized supply air to the control chamber 34 to hold the shut-off valve shifted as long as the throttle valve 16 is held open.

When the operator releases the throttle valve to closed condition, flow of supply air to the shut-off valve stops. Normal leakage of air from the control chamber 34 then dissipates the pressurized condition of the latter so as to allow the shut-off valve to be reopened by its spring 26. The tool is then in condition to start the next cycle.

While an embodiment of the invention has been illustrated and described in detail, it is to be expressly understood that the invention is not limited thereto. Various changes of form, design or arrangement may be made in its parts without departing from the spirit and scope of the invention; and it is my intention, therefore, to claim the invention not only as shown and described but also in all such forms and modifications thereof as might be reasonably construed to be within the spirit of the invention and the scope of the appended claims.

What is claimed is:

1. A centrifugally operable pressure air relief valve unit comprising a body having an axially extending hub adapted for connection with a rotor shaft in axial extension of the shaft and for rotation with the shaft, a chamber within the body having a ball valve seat connecting with a vent port through the body, an air inlet port to the chamber adapted for connection with a source of pressure air, a ball valve axially movable in the chamber relative to the seat in response to centrifugal forces created by rotation of the unit, and a spring normally biasing the ball valve closed upon its seat; wherein the seat is concaved having an axis extending parallel to and in eccentric relation to the longitudinal axis of the body, the vent port is coaxial with the axis of the seat, a portion of the inlet port extends through the valve seat in parallel eccentric relation to the axis of the latter, and the ball valve in its seated condition having a closed relation to the vent port and a partially closed relation to the inlet port.

2. A centrifugally operable pressure air relief valve unit comprising a body having an axially extending hub adapted for connection with a rotor shaft in axial extension of the shaft and for rotation with the shaft, a chamber within the body having a ball valve seat connecting with a vent port through the body, an air inlet port to the chamber adapted for connection with a source of pressure air, a ball valve axially movable in the chamber relative to the seat in response to centrifugal forces created by rotation of the unit, a spring normally biasing the ball valve closed upon its seat, and the chamber being located eccentrically of the longitudinal axis of the body; wherein an elongated bore is formed in the body in an area opposite to that of the chamber and in parallel relation to the longitudinal axis of the body, and a counterbalancing pin load is fitted in the bore whereby the body is evenly balanced about its longitudinal axis.

3. A centrifugally operable pressure air relief valve unit as in claim 2, wherein wrenching flats are provided at opposite surface areas of the body.

4. A centrifugally operable pressure air relief valve unit as in claim 2, wherein the hub is threaded for engaging it with a rotor shaft.

5. A centrifugally operable pressure air relief valve unit as in claim 2, wherein the chamber has an open end allowing removal of the spring and ball valve, and a removable cap closes over the open end, the cap having a cup portion extending into the chamber, the cup serving as a retainer for the spring and as an abutment limiting the extent of axial movement of the ball valve relative to the seat.

6. The combination in a valve unit comprising a body having a valve chamber provided with an air inlet port and an exhaust port, a ball valve movable from and to seated condition relative to the exhaust port, a spring normally biasing the valve seated, the valve having response to centrifugal forces to move from the exhaust port against the bias of the spring, and a rotary motor having a rotor shaft connection with the body for imparting centrifugal forces to unseat the valve so as to communicate the inlet port through the chamber with the exhaust port, wherein the ball valve and the chamber are disposed in the body on an axis parallel and in eccentric relation to the longitudinal axis of the body, and means is provided within the wall of the body for effecting a balanced condition of the valve body about its longitudinal axis.

7. A centrifugally operable pressure air relief valve unit comprising a body having an axially extending hub adapted for connection with a rotor shaft in axial extension of the latter and for rotation with the shaft, a chamber within the body having a concave seat for a ball valve, a vent port opening through the center of the seat into the chamber, a pressure air inlet port extending axially through the hub and in part through the seat into the chamber, a ball valve normally positioned on the seat in closed relation to the vent port and in partially closed relation to the inlet port, and a spring normally biasing the valve upon its seat, the valve being movable off its seat to communicate the inlet port with the vent port in response to centrifugal forces arising with rotation of the unit.

* * * * *